US005705253A

United States Patent [19]
Berg et al.

[11] Patent Number: 5,705,253
[45] Date of Patent: Jan. 6, 1998

[54] VIDEO RECORDING TAPES SUITABLE FOR HIGH SPEED CONTACT DUPLICATION

[75] Inventors: Alvin M. Berg; Benedict L. Bezenek, both of Roseville; Thomas M. Bohlsen, Woodbury; James G. Carlson, Lake Elmo; Daniel Y. Chang, Vadnais Heights; John C. Harvey, St. Paul; Stephen A. Johnson, Oakdale; Kevin K. Kuck, White Bear Lake; Robert P. McCollam, Roseville, all of Minn.

[73] Assignee: Minnesota Mining and Manufacturing Company, St. Paul, Minn.

[21] Appl. No.: 258,401

[22] Filed: Jun. 13, 1994

[51] Int. Cl.$^6$ .............................. G11B 5/66; G11B 5/70
[52] U.S. Cl. .................... 428/141; 428/143; 428/147; 428/694 B; 428/694 BB; 428/694 BN; 428/694 BY; 428/694 BU; 428/694 BR; 428/694 BL; 428/900
[58] Field of Search ............ 428/694 B, 694 SG, 428/694 BU, 694 BR, 694 BN, 402, 141, 406, 900, 694 BB, 694 BY, 694 BL, 143, 147

[56] References Cited

U.S. PATENT DOCUMENTS

| | | | |
|---|---|---|---|
| 3,460,984 | 8/1969 | Bisschops et al. | 428/425.9 |
| 4,135,031 | 1/1979 | Akashi et al. | 428/323 |
| 4,163,823 | 8/1979 | Legras et al. | 428/304 |
| 4,328,935 | 5/1982 | Steel | 428/900 X |
| 4,363,038 | 12/1982 | Fayling | 360/17 |
| 4,450,199 | 5/1984 | Tadokoro et al. | 428/317.9 |
| 4,529,661 | 7/1985 | Ninomiya et al. | 428/425.9 |
| 4,534,999 | 8/1985 | Roller et al. | 427/130 |
| 4,571,364 | 2/1986 | Kasuga et al. | 428/336 |
| 4,612,244 | 9/1986 | Kaneda et al. | 428/323 |
| 4,732,812 | 3/1988 | Ebner et al. | 428/425.9 |
| 4,762,902 | 8/1988 | Murphy | 528/75 |
| 4,783,370 | 11/1988 | Chernega et al. | 428/425.9 |
| 4,786,557 | 11/1988 | Kakuishi et al. | 428/413 |
| 4,985,295 | 1/1991 | Ishihara et al. | 428/213 |
| 5,028,483 | 7/1991 | Chernega et al. | 428/329 |
| 5,034,271 | 7/1991 | Miyoshi et al. | 428/323 |
| 5,069,963 | 12/1991 | Yanai et al. | 428/323 |
| 5,151,330 | 9/1992 | Kumamoto et al. | 428/425.9 |
| 5,217,820 | 6/1993 | Isshiki et al. | 428/694 B |
| 5,230,818 | 7/1993 | James et al. | 252/62.55 |

FOREIGN PATENT DOCUMENTS

| | | |
|---|---|---|
| 0 494 793 A1 | 1/1992 | European Pat. Off. . |
| 0 515 902 A1 | 5/1992 | European Pat. Off. . |
| 0 570 846 A2 | 5/1993 | European Pat. Off. . |
| 57-141020 | 9/1982 | Japan . |
| 61-168614 | 7/1986 | Japan . |
| 03 64310 | 3/1991 | Japan . |
| 03 64314 | 3/1991 | Japan . |
| 1 364 045 | 10/1970 | United Kingdom . |

OTHER PUBLICATIONS

Proceedings of the Japan International Tribology Conference, Nagoya, 1990, "Influence of magentic coating film porosity on kinetic friction and slider flying characteristics" by Uasuo Ohtsubo, Yuji Kubota and Atsushi Takahashi, pp. 1315–1316.

IEEE Transactions on Magnetics, vol. MAG–20, No. 1, Jan. 1984, "Mercury Porosimetry Analysis of Magnetic Coatings", by H.F. Huisman and C.J.F.M.Rasenberg, pp. 13–15.

BASF Advertisement, 1994, "Introducing BASF Backcoated Sprinter Tape".

*Primary Examiner*—Stevan A. Resan
*Assistant Examiner*—Stephen Sand
*Attorney, Agent, or Firm*—Charles D. Levine

[57] ABSTRACT

Disclosed is a video tape suitable for use in high speed contact duplication. The magnetic layer comprises a magnetic pigment dispersed in a polymeric binder at amounts of magnetic pigment between 75 and 88 percent by weight of the magnetic layer with a total pigment loading (magnetic+ nonmagnetic pigments) of at least 80 percent by weight. The tape is provided with a backside coating comprising at least two nonmagnetic pigments dispersed in a polymeric binder, the first nonmagnetic pigment, being a conductive material and having a relatively small particle size of between about 0.015 and 0.15 µm, and the second nonmagnetic pigment having a relatively large particle size of between about 0.15 and 1.5 µm. The magnetic layer has a lubricant absorption value of at least 4 and a surface roughness of between 5 and 15 nm. The backside coating has a surface roughness of between 10 and 150 nm. The polymeric binder of either or both of the magnetic layer and the backside coating may preferably comprise a hard component resin and a soft component resin, wherein the soft component resin is a polyurethane having a plurality of pendant carboxy groups.

29 Claims, No Drawings

VIDEO RECORDING TAPES SUITABLE FOR HIGH SPEED CONTACT DUPLICATION

FIELD OF THE INVENTION

The present invention relates to magnetic recording media and more specifically to video recording tapes suitable for high speed contact duplication as well as real time operations.

BACKGROUND INFORMATION

Video recording tapes typically comprise a magnetic layer coated on a nonmagnetic substrate. Historically, copies of information, such as movies, were made on the video tapes by real time duplication. With increasing demand for pre-recorded video products, however, high speed duplication methods have been developed.

High speed contact duplication, also known as anhysteretic duplication, involves the transfer of magnetically recorded information from a master tape to a copy tape. The transfer frequently is accomplished in a duplicating apparatus known as a Sprinter™ duplicator (Sony Corp.).

The duplication occurs in a transfer area in which a master tape, a copy tape, and, optionally, a drive tape, are sandwiched under air pressure between a transfer drum and a transfer head, with the magnetic surfaces of the master and copy tapes in contact. A bias field is applied in the transfer area so that the mirror image of the magnetic pattern on the master tape is transferred onto the copy tape. The nonmagnetic side of the copy tape contacts the transfer drum. In certain models of Sprinter™ duplicators, the copy tape may actually be driven by the transfer drum. During duplication, the tapes travel at high speeds from about 100 to 600 times the normal playback speed. During the high speed contact duplication process, it is crucial to maintain accurate and intimate contact between the master tape and the copy tape in the transfer area. Good tape-to-tape contact promotes efficient short wavelength transfer between the tapes. However, because of the high speed involved in this duplicating process and the large areas of contact between the master tape and the copy tape, a film of air may form between the master tape and the copy tape in the transfer area during recording (a phenomenon known as air entrapment). Air entrapment reduces tape-to-tape contact, resulting in a reduced RF signal transferred to the copy tape. RF signal loss may be perceived as dropouts or other visual disturbances on a monitor when the video tape is played back.

A variety of options may be available for reducing air entrapment. First, the roughness of the magnetic surface of the copy tape, the master tape, or both can be increased in order to allow air to escape from the transfer area. However, the rough texture may also increase the tape-to-tape spacing resulting in signal loss on the copy tape. As a second option, the stiffness of the copy tape can be increased. With added stiffness, the copy tape exerts more pressure against the master tape, thereby increasing the rate at which air is forced to leave the tape-to-tape interface. Increased tape stiffness is generally achieved by increasing the thickness of the nonmagnetic substrate. This approach, however, reduces the amount of tape that can fit inside a video cassette housing, thereby reducing the length of a movie or the like that can be duplicated onto the copy tape.

Another concern during duplication is the tracking of the copy tape with the master tape. The master tape and the copy tape should align as exactly as possible in the transfer area to avoid signal shifting. Such signal shifting generally leads to RF instability problems as well as problems in changing between various playback and recording machines.

In addition, the winding quality of the copy tape at high duplicating speeds must be preserved and the tension of the tape when played back in a video cassette recorder must be maintained at acceptable levels.

In view of these design concerns, the characteristics of both the magnetic and nonmagnetic surfaces of the copy tape must be considered. For instance, most of the previously known high speed contact duplicating copy tapes were made and sold without a backside coating on the nonmagnetic surface. Until recently, the industry has felt that the demands of signal quality, winding quality, tape tension, and tracking could not be satisfied by a single backside coating. Indeed, a major commercial supplier of high speed contact duplicating copy tapes has publicly stated that magnetic recording tapes having a backside coating are not suitable for high speed contact duplication. Previous attempts to use backside coated tape have failed due to the difficulty in achieving necessary surface characteristics for good tracking in high speed contact duplication while maintaining needed properties for real time and playback operations.

Unfortunately, copy tapes without backside coatings often are less durable and have poorer real time operation characteristics, such as high tension during playback. In addition, such a tape must incorporate a needed antistatic agent, typically carbon black particles, into the magnetic layer. The presence of the antistatic agent reduces the available space for magnetic pigment in the magnetic layer which may in turn reduce the recording performance of the tape. To compensate for the reduced magnetic pigment loading a higher cost magnetic pigment is frequently necessary, making the tape less economical to manufacture.

SUMMARY OF THE INVENTION

The present invention provides a magnetic recording medium which is useful as a copy tape for high speed contact duplication and meets JVC specifications for qualification as a VHS tape. The medium has a magnetic layer which is highly porous to help reduce air entrapment, yet very smooth to enable good contact between the copy tape and master tape. This copy tape also has a backside coating with a combination of nonmagnetic pigments which provide excellent tape tension, tracking, winding and signal characteristics. A nonmagnetic antistatic agent such as carbon black may be incorporated into the backside coating, leaving maximum available space in the magnetic layer for loading with magnetic pigment. Good electromagnetic performance of the medium can therefore be achieved using a lower-cost magnetic pigment.

The present invention is based in part upon the discovery that a combination of a highly porous, yet extremely smooth, magnetic layer promotes intimate contact between the master and copy tapes, thereby improving the quality of recording during high speed, contact duplication. The smoothness of the magnetic layer enhances the surface contact at the tape-to-tape interface. The porosity of the magnetic layer allows air to escape from between the tapes into the pores such that the tape-to-tape spacing is minimized. This approach is particularly advantageous when the pore size does not interfere with the wavelength being recorded. Due to the good contact achieved between a copy tape of this invention and a master tape via porosity and smoothness, the copy tape need not be as stiff as standard high speed contact duplication tapes. Thus, a thinner nonmagnetic substrate may be used which reduces manufacturing costs and may enable more to fit inside the video cassette housing. Thus, the porosity and smoothness of the magnetic coating makes magnetic recording tapes of the present invention extremely well-suited for use as a copy tape for high speed duplication.

We have also found that tracking of the copy tape with the master tape is affected by the relationship of the friction at high speed between the master tape and the copy tape and the friction between the copy tape and the transfer drum. The magnetic layer of the copy tape should "grip" the master tape more strongly than the backside coating "grips" the transfer drum, so that the copy tape will tend to follow the path of the master tape and be relatively insensitive to deviations of the transfer drum such as wobbling and loss of tram. However, in the case of drum-driven duplicators, the friction between the backside coating of the copy tape and the transfer drum must be high enough that the transfer drum is able to propel the copy tape at the desired speed.

The present invention provides a magnetic recording medium having a nonmagnetic substrate with a first and a second major surface, a magnetic layer provided on the first major surface and a backside coating provided on the second major surface. The magnetic layer comprises a magnetic pigment dispersed in a polymeric binder. The amount of magnetic pigment is preferably between 75 and 88 percent, more preferably between 79 and 86 percent, by weight of the magnetic layer. The backside coating comprises at least two nonmagnetic pigments dispersed in a polymeric binder, the first nonmagnetic pigment being a conductive material and having a relatively small particle size of between about 0.015 and 0.15 µm, and the second nonmagnetic pigment having a relatively large particle size of between about 0.15 and 1.5 µm. The magnetic layer has a lubricant absorption value (a measure of porosity) of at least 4 and a surface roughness of less than 15 nm. The backside coating has a surface roughness of between 15 and 150 nm. According to a preferred embodiment of the present invention, the slippage ratio of the magnetic layer to the backside coating is at least 0.9, and the relative slippage of the backside coating is between 71 and 83 percent.

In another preferred embodiment of the present invention, the polymeric binder of either or both of the magnetic layer and the backside coating comprises a hard component resin and a soft component resin, wherein the soft component resin is a polyurethane having a plurality of pendant carboxy groups. Compared to known binders used in magnetic media, this polymeric binder provides a smoother surface which improves contact between the magnetic layer of the copy tape and the master tape. Contact is also improved because this binder is fairly hard and has a high coating modulus, which leads to a stiffer tape. An additional benefit of this binder is that it generates less debris than many binders currently used in magnetic recording elements. A particularly preferred embodiment of the carboxy functional polyurethane can be made from inexpensive monomers, which can make the magnetic tape extremely economic to manufacture.

DESCRIPTION OF THE PREFERRED EMBODIMENTS

Magnetic recording media of the present invention comprise a nonmagnetizable substrate having first and second major surfaces. The particular nonmagnetizable substrate of the present invention may be formed from any suitable substrate material known in the art. Examples of suitable substrate materials include, for example, polymers such as polyethylene terephthalate ("PET"), polyimide, and polyethylene naphthalate ("PEN"), or any other suitable material. Thickness of the substrate is typically in the range of 10–20 µm. The surface may be primed or treated to promote better adhesion between the substrate and the coatings.

In the practice of the present invention, a magnetic layer is provided on the first major surface of the nonmagnetizable substrate and a backside coating is provided on the second major surface of the nonmagnetizable substrate. The components of the magnetic layer comprise a magnetic pigment dispersed in a polymeric binder. Preferably, the magnetic layer contains from 75 to 88 percent, more preferably 79 to 86 percent by weight magnetic pigment based on the weight of the dried and cured magnetic layer. The type of magnetic pigment used in the present invention may include any suitable magnetic pigment known in the art including $\gamma$-$Fe_2O_3$, cobalt-doped $\gamma$-$Fe_2O_3$, $Fe_3O_4$, $CrO_2$, barium ferrite, barium ferrite derivatives, metal particles, and the like.

The magnetic layer of the present invention contains a weight loading of magnetic pigment that is unusually high for magnetic recording tapes adapted for high speed contact duplication applications. The ability to incorporate such higher loadings of magnetic pigment in the magnetic layer is due in part to the medium of this invention having a backside coating which contains carbon black particles as an antistatic agent. In the magnetic recording medium of this invention, carbon black is present in the backside coating instead of the magnetic layer, thereby creating more loading capacity for magnetic pigment in the magnetic layer. Such higher weight loadings of magnetic pigment (made possible by the development of our backside coating) allow us to use a less expensive magnetic pigment, yet still achieve the same level of electromagnetic performance as previously known high speed contact duplication tapes which use lesser amounts of more expensive magnetic pigments, such as $CrO_2$ and cobalt doped $\gamma$-$Fe_2O_3$ from Toda Kogyo Corp. and from Ishihara Sangyo Kaisha Ltd. The ability of the present invention to use less expensive pigments, such as certain types of cobalt doped $\gamma$-$Fe_2O_3$ and $\gamma$-$Fe_2O_3$, makes the invention much more economical to manufacture.

In the practice of the present invention, the magnetic layer desirably has a porosity sufficient to help eliminate the air film that tends to develop during high speed contact duplication. The level of porosity can vary within a wide range and still be suitable. However, if the porosity is too low, then progress toward reducing air entrapment is not achieved. The useful upper limit of porosity may be limited by roughness or durability considerations. This upper limit may vary with such factors as the choice of binder, caliper of the magnetic layer, and the use of low molecular weight dispersants to aid in dispersing the pigment in the binder. We have found that a level of porosity indicated by a lubricant absorption value of greater than 4, preferably 5 to 15, more preferably 5 to 9, is suitable.

For the purposes of the present invention, porosity is measured in one way by a lubricant absorption test which provides a lubricant absorption value. Generally, a higher lubricant absorption value indicates greater porosity. To conduct the test, a series of solutions containing 1, 2, 3, 4, 5, 6, 7, 8, 9, 10, 11, 12, 13, 14, 15, 16, 17, 18, 19, and 20 percent by weight of a lubricant in isopropanol are prepared. The lubricant used in the practice of this invention was isocetyl stearate from Henkel Chemical Co. A corresponding number of samples of the magnetic recording medium to be tested, each measuring 0.5 in×10 in (1.27 cm×25.4 cm) are secured to a flat surface with the magnetic layer facing up.

Using a syringe, a 2 µl drop of each lubricant solution is placed on the surface of the corresponding sample. After 16 hours, the samples are observed to identify whether each lubricant solution was fully absorbed, partially absorbed, or not absorbed by the sample. The lubricant absorption value is given as the weight loading of the lubricant in the solution having the most lubricant which was fully absorbed by the corresponding sample. For example, if solutions 1 through 4 were fully absorbed by a sample, but solutions 5 through 20 were not fully absorbed by the sample, then the lubricant absorption value, i.e., the porosity, of the sample would be 4. Likewise, if solutions 1 through 8 were fully absorbed by a sample, but solutions 9 through 20 were not fully absorbed by the sample, then the lubricant absorption value, i.e., the porosity, of the sample would be 8. Preferably, the test can be repeated. The lubricant absorption value would then be given as the average of the values obtained from the various tests. Porosity is measured by lubricant absorption after the magnetic layer is dried and cured. If the magnetic layer is calendered during manufacture, then porosity is measured after calendering.

The porosity of the magnetic layer can be adjusted in a variety of ways, including varying the weight loading of pigments in the magnetic layer, such pigments including both magnetic pigments and non-magnetic pigments such as fillers, head cleaning agents, etc. Generally, increasing the weight loading of the pigments increases the porosity of the magnetic layer. Likewise, reducing the weight loading of the pigments reduces the porosity of the magnetic layer. Preferably the total amount of pigment used (magnetic and nonmagentic pigments) is 80 percent or more, more preferably 81 to 88 percent, and most preferably 82 to 85 percent, by weight of the dried and cured magnetic layer. Using a smaller quantity of low molecular weight dispersants, if any, than is commonly used also may increase the porosity. Preferably, the amount of low molecular weight dispersants is less than 3 percent by weight of magnetic pigment. In preferred embodiments, the pore size in the magnetic layer of the present invention is so fine, that the porosity cannot be detected by Rq (interferometry) testing. Such small pore size is desirable not only for surface smoothness but also to prevent the pores from interfering with the wavelength being recorded.

Magnetic layers of the present invention desirably have a surface roughness (Rq) of less than 15 nm, preferably less than 10 nm, and more preferably in the range from 6 nm to 9 nm. In the practice of the present invention, surface roughness (Rq) is measured with the Wyko High Resolution Interferometer. Surprisingly, the present invention provides a magnetic layer having both a very smooth surface and high porosity.

In addition to the polymeric binder and the magnetic pigment, the magnetic layer of the present invention may also comprise one or more conventional additives such as lubricants; abrasives; head cleaning agents; thermal stabilizers; antioxidants; dispersants; wetting agents; antistatic agents; fungicides; bactericides; surfactants; coating aids; nonmagnetic pigments; and the like in accordance with practices known in the art.

In the practice of the present invention, the second major surface of the substrate, which is the nonmagnetic side, is provided with a backside coating. The backside coating has surface characteristics which provide the copy tape with excellent signal quality, winding quality, contact, tape tension, and tracking properties. The use of a backside coating is believed to provide copy tapes for high speed contact duplication with better durability and dropout performance over time. The use of a backside coating also eliminates the need to displace magnetic pigment in the magnetic layer with an antistatic agent, thereby avoiding the signal degradation accompanying such displacement.

The backside coating of the present invention comprises at least two nonmagnetic pigments of different sizes dispersed in a polymeric binder. The polymeric binder of the backside coating is preferably present in an amount between 35 and 50 parts by weight (pbw), more preferably between 40 and 45 parts by weight, based on 100 parts by weight of the dried backside coating. The backside coating may have a caliper, i.e., thickness, within a wide range, although backside coatings having a caliper in the range from about 0.45 to about 1 µm have been found to be suitable within the practice of the present invention.

The nonmagnetic pigments which are added to the backside layer include a first nonmagnetic pigment which is relatively small-sized, and a second nonmagnetic pigment which is relatively large-sized. The first nonmagnetic pigment preferably has an average particle size in the range from 0.015 to 0.15 µm. For the purposes of this invention, particle size is measured by transmission electron microscopy (TEM). The first nonmagnetic pigment serves as an antistatic agent and, thus, should be electrically conductive. The first nonmagnetic pigment is most preferably carbon black. A specific example of a relatively small-sized first nonmagnetic pigment found to be suitable in the practice of the present invention is Vulcan XC-72 from Cabot Corp.

The second nonmagnetic pigment preferably has an average particle size in the range from 0.15 to 1.5 µm, preferably 0.3 to 0.7 µm. The thickness of the backside coating limits the upper range of particle size. As a general rule, particle size should be no more than twice the thickness of the backside coating. In one preferred embodiment, the second nonmagnetic particle has a Mohs hardness in the range between 6 and 8. Suitable second nonmagnetic pigments include carbon black, silica, alumina, $TiO_2$, and the like.

The first and second nonmagnetic pigments can be present in the backside coating at a wide variety of weight loadings. Generally, the relatively small-sized first nonmagnetic particle should be present in an amount sufficient not only to impart adequate opacity and conductivity to the backside layer but also to adjust surface characteristics by contributing to surface smoothness. The relatively large-sized second nonmagnetic pigment should be present in an amount sufficient to impart durability and reduced frictional characteristics to the backside coating. Functionally, this is believed to be accomplished by the larger-sized, second nonmagnetic pigment providing load-bearing protrusions in the backside coating that facilitate transport of the tape through the duplicating and playback processes. Using 5 to 50 parts by weight of the first magnetic pigment and 5 to 50 parts by weight of the second nonmagnetic pigment (based on 100 parts of dried backside coating) would be suitable in the practice of the present invention. The relative amounts of the first and second nonmagnetic pigments can vary, but the weight ratio of the first pigment to the second pigment is preferably in the range from 1:100 to 100:1, and more preferably 20:1 to 1.5:1.

The particle size and quantity of the nonmagnetic pigments contribute to the surface roughness (Rq) of the backside coating, which in turn is believed to affect the performance of the magnetic recording medium as a copy tape for high speed contact duplication. The backside coating must be rough enough to provide suitable friction between the copy tape and the transfer drum and also to provide acceptable tape tension in a video cassette recorder, while being smooth enough to preserve the quality of the duplicated signal. Backside coatings of the present invention have a surface roughness (Rq) in the range between 15 and 150 nm, and more preferably between 25 and 125 nm. Surface roughness is measured using a Wyko Rough Surface Topography (RST) Interferometer. The backside coating may further comprise additional nonmagnetic pigments such as $Al_2O_3$, hollow ceramic microspheres such as Zeeospheres™ (see copending U.S. Pat. No. 5,607,747, or additional carbon black, $TiO_2$, and the like, such pigments having a size distinct from the size of the first or second nonmagnetic pigments. For example, the backside coating may further comprise a third nonmagnetic pigment having a particle size of between 0.7 and 1.5 μm.

In addition to the polymeric binder and nonmagnetic pigments, backside coatings of the present invention may also include other conventional additives such as catalysts, crosslinking agents, wetting agents, thermal stabilizers, antioxidants, antistatic agents, fungicides, bactericides, lubricants, and the like, in accordance with practices known in the art.

The dynamic frictional characteristics of both the magnetic layer and the backside coating, as well as the relationship between the two, have been found to be particularly important in the practice of the present invention. For example, the friction between the backside coating and the transfer drum should be high enough to enable the transfer drum to drive the copy tape (if necessary) and also to enable the copy tape to wind properly without telescoping in the duplicator. If such friction is too high, however, the copy tape may follow the path of the transfer drum and become misaligned from the master tape. In addition, the frictional characteristics of the magnetic layer must enable the copy tape to "grip" the surface of the master tape and encourage good tracking.

These dynamic frictional characteristics may be characterized by slippage of the tape on a chrome plated transfer drum, also known as a print wheel. The test is conducted on a modified high speed duplicating apparatus having a non-driven, air-bearing, chrome-plated transfer drum. The copy tape is threaded over a series of guide rollers and through a fixed air gap between the transfer drum and an air cap, through which air cap pressure may be adjusted. The air cap gap is set with a shim to be larger than the gap typically used in high speed contact duplication. We have set the gap at 0.375 mm. The line speed of the copy tape is controlled by a drive roller. A tachometer is positioned to measure the rotational speed of the transfer drum. The tachometer must not interfere with the rotation of the transfer drum.

The air cap pressure, which determines the normal force of the tape against the drum, is calibrated using a standard high speed contact duplication copy tape having no backside coating. The calibration tape used in the practice of this invention was Sony KNIII duplication tape. Other tapes may be used for calibration but may provide different numerical results. In a first step, the calibration tape is threaded into the tester so that the magnetic side is brought into contact with the transfer drum by the air cap pressure. The tape is maintained at a constant tension between about 50 and 100 g throughout the testing. The tape travels at 5 m/s linespeed, the revolutions of the transfer drum corresponding to this line speed is calculated, and the air pressure setting is adjusted until the transfer drum is rotating at a speed of between 95 to 99 percent of line speed, i.e. a certain amount of slippage between the tape and the drum is desired. Drum speed measurements are taken at steady state conditions when the rpms reach a constant level. In a second step, the calibration tape is rethreaded so the nonmagnetic side is in contact with the transfer drum. The tape is again run at 5 m/s line speed and the air pressure adjusted until the speed of the transfer drum is between 70 and 75 percent of line speed. The two steps are repeated if necessary making iterative air pressure adjustments until a setting is reached at which the transfer drum rotates at the desired speed for both sides of the calibration tape. This setting, tape tension, and the 5 m/s line speed are kept constant for the remainder of the test.

In order to test a copy tape of this invention, the tape is first run in the tester with its magnetic side in contact with the transfer drum, while recording the speed of the transfer drum as R1. A slower drum speed generally indicates lower friction between the tape and the transfer drum. The tape is then run with its backside coating in contact with the transfer drum, with a resulting transfer drum speed of R2. The magnetic/backside slippage ratio is then calculated as R1/R2, and the relative backside slippage is calculated as (R2/line speed)×100.

It has been observed that the ratio of the magnetic layer slippage to the backside coating slippage must be sufficiently high to enable the copy tape to follow the path of the master tape accurately and be relatively insensitive to deviations of the transfer drum such as wobbling and loss of tram. We have found that a relative backside slippage of between 71 and 83 percent, and preferably between 77 and 83 percent, is suitable. A magnetic/backside slippage ratio of at least 0.9, preferably at least 1.0, and most preferably between 1.15 and about 1.4 is suitable.

The polymeric binder of the magnetic layer or the backside coating can be any suitable binder known in the art. The polymeric binder of the magnetic layer can be the same or different from the polymeric binder of the backside coating. However, due to the different demands placed on each, the polymeric binders are most commonly different from each other. Typically, the polymeric binder of either layer comprises a combination of polymers including a hard component resin, i.e., a polymer having a glass transition temperature higher than 50° C. and a soft component resin, i.e., a polymer having a glass transition temperature below 50° C. Examples of hard component resins suitable in the practice of the present invention include phenoxy, vinyl chloride copolymers, non-halogenated vinyl copolymers, etc. Examples of soft component resins suitable in the practice of the present invention include polyurethanes, polyesters, polyureas, etc. The weight ratio of the hard component resin to the soft component resin is in the range from 1:19 to 19:1, preferably 1:5 to 5:1, and more preferably 1:2 to 2:1. In other instances, the polymeric binder of the magnetic layer may be prepared from only a single polymer. For example, U.S. Pat. No. 5,128,215 describes a magnetic layer whose polymeric binder is obtained from a single, star block copolymer.

Optionally, one or more polymers of the polymeric binder may have one or more functional groups, either pendant from or incorporated into the polymer backbone, to enhance the performance of the magnetic recording medium. For example, such polymer or polymers may contain carbon-carbon double bonds and/or hydroxy groups in order to facilitate crosslinking.

As other examples of functional groups, such polymer or polymers may contain pendant dispersing groups to help disperse the magnetic pigment in the polymeric binder. As used throughout this specification, the term "dispersing group" means that a group is capable of wetting the magnetic pigment. Preferably, the term "dispersing group" means a group that is ionized or ionizable at a pH in the range from 2 to 10. Representative examples of suitable dispersing groups include quaternary ammonium moieties (e.g., $-N(CH_3)_3^+Cl^-$ as one example), amines (e.g., $-N(CH_3)_2$ as one example), heterocyclic moieties as described in U.S. Pat. No. 5,081,213, sulfobetaines (e.g., $-N^+(CH_3)_2(CH_2CH_2CH_2SO_3^-)$), salts or acids based on sulfate (e.g., $-OSO_3Na$ as one example), salts or acids based on sulfonate (e.g., $-SO_3Na$ as one example), salts or acids based on phosphate (e.g., $-OPO(OH)_2$ as one example), salts or acids based on phosphonate (e.g., $-PO(OH)_2$ as one example), salts or acids based on carboxyl (e.g., $-COONa$ as one example), mixtures thereof, and the like.

As a result of using such dispersing groups, less low molecular weight dispersant or wetting agent, or even no low molecular weight dispersant or wetting agent, may be needed to help disperse the magnetic and nonmagnetic (if any) pigments in the polymeric binder. In preferred embodiments of the present invention in which the polymeric binder of the magnetic layer and/or the backside layer comprises a hard component resin and a soft component resin, at least one of these resins comprises a pendant crosslinkable moiety and a pendant dispersing moiety. More preferably, each of the hard and soft component resins comprises a pendant crosslinkable group and a pendant dispersing group.

In those instances wherein the polymer or polymers of the polymeric binder comprise pendant or terminal hydroxyl groups, the polymeric binder may further comprise an isocyanate crosslinking agent to facilitate crosslinking of the hydroxyl groups. The isocyanate crosslinking agent, if any, is a polyfunctional isocyanate having an average functionality of at least 2 isocyanate groups per molecule. One example of a specific polyfunctional isocyanate useful as the isocyanate crosslinking agent in the practice of the present invention is a toluene diisocyanate alcohol adduct commercially available as Mondur CB-601 from Miles Inc.

The isocyanate crosslinking agent is preferably used in an amount such that the molar ratio of NCO groups from the isocyanate crosslinking agent relative to the total number of hydroxy groups from the first and second polymers is preferably in the range from 0.3 to 3.0, more preferably 1.3 to 2.5.

In a particularly preferred embodiment of the present invention, the polymeric binder of the magnetic layer comprises a polyurethane having pendant carboxy groups and a nonhalogenated vinyl copolymer comprising pendant nitrile groups, pendant hydroxyl groups, and one or more pendant dispersing groups. Nonhalogenated means that the copolymer contains no covalently bound halogen atoms. Thus, the term excludes vinyl halide monomers such as vinyl chloride but does not exclude components in which the halogen is present as an anion. Referring first to the nonhalogenated vinyl copolymer, nitrile groups may be incorporated into the copolymer by copolymerizing one or more nitrile-functional vinyl monomers with the other monomers used to make the copolymer. Representative examples of such monomers include (meth)acrylonitrile, β-cyanoethyl-(meth)acrylate, 2-cyanoethoxyethyl (meth)acrylate, p-cyanostyrene, p-(cyanomethyl)styrene, and the like. Preferably, the nitrile functional, nonhalogenated vinyl monomer is (meth) acrylonitrile, and more preferably acrylonitrile. We also believe that the nitrile group may promote the compatibility of these vinyl copolymers with polyurethanes.

The pendant hydroxyl groups of the vinyl copolymer not only facilitate dispersion of the magnetic pigment in the polymeric binder, but also promote solubility, cure, and compatibility with other polymers. The hydroxyl groups may be primary, secondary, or tertiary, although primary and secondary hydroxyl groups are preferred. Generally, preferred vinyl copolymers of the present invention have a hydroxyl equivalent weight in the range from about 300 to about 10,000, preferably 500 to 5000, more preferably 800 to 1500.

In order to provide a vinyl copolymer having a plurality of pendant hydroxyl groups, one or more nonhalogenated, hydroxyl functional, vinyl monomers may be incorporated into the vinyl copolymer. Representative examples of suitable nonhalogenated, hydroxyl functional, vinyl monomers include an ester of an α,β-unsaturated carboxylic acid with a diol, e.g., 2-hydroxyethyl (meth)acrylate, or 2-hydroxypropyl (meth)acrylate; 1,3-dihydroxypropyl-2-(meth)acrylate; 2,3-dihydroxypropyl-1-(meth)acrylate; an adduct of an α,β-unsaturated carboxylic acid with caprolactone; an alkanol vinyl ether such as 2-hydroxyethyl vinyl ether; 4-vinylbenzyl alcohol; allyl alcohol; p-methylol styrene; or the like. Preferably, the nonhalogenated, hydroxyl functional, vinyl monomer is selected from 2-hydroxyethyl (meth)acrylate, 2-hydroxypropyl (meth)acrylate, and mixtures thereof. Alternatively, vinyl copolymers with pendant hydroxyl groups can also be prepared by incorporating vinyl acetate into the vinyl copolymer and then partially or fully hydrolyzing the acetate moieties to produce hydroxyl groups.

The dispersing group, if any, of the vinyl copolymer facilitates dispersion of the magnetic pigment in the polymeric binder. In those instances wherein the vinyl copolymer includes more than one dispersing group, the dispersing groups may be the same, or they may be different. It is desirable that the vinyl copolymer have a dispersing group equivalent weight in the range from about 2000 to about 100,000, preferably about 5000 to about 50,000.

One or more dispersing groups can be introduced into the vinyl copolymer in a variety of ways. As one approach, dispersing initiators may be used. Dispersing initiators initiate copolymerization of vinyl monomers to provide vinyl copolymers with terminal dispersing groups. Examples of suitable dispersing initiators include 4,4'-azobis (cyanovaleric acid), succinic acid peroxide, potassium persulfate, and sodium perphosphate. Another approach for introducing the dispersing group into the vinyl copolymer is to use a functional chain transfer agent such as mercaptosuccinic acid during copolymerization of the vinyl monomers.

The dispersing group may also be introduced into the vinyl copolymer through the use of a nonhalogenated, vinyl monomer bearing a dispersing group. Representative examples of suitable nonhalogenated, vinyl monomers bearing a dispersing group include (meth)acryloyloxyethyl trimethyl ammonium chloride, (meth)acryloyloxyethyl acid phosphate, (meth)acrylamidopropyl trimethylammonium chloride, (meth)acryloyloxypropyl dimethylbenzylammonium chloride, vinylbenzyl trimethylammonium chloride, 2-hydroxy-3-allyloxypropyl trimethylammonium chloride, (meth)acrylamidopropyl sodium sulfonate, sodium styrene sulfonate, styrene sulfonic acid, (meth)acrylic acid, maleic acid, fumaric acid, maleic anhydride, vinyl sulfonic acid, 2-(meth)acrylamide-2-methyl-1-propanesulfonic acid, dimethylaminoethyl (meth)acrylate, maleic anhydride, N-(3-sulfopropyl)-N-(meth)acryloyloxyethyl-N,N-dimethylammonium betaine, 2-[(meth)acryloyloxy]ethyl trimethylammonium methosulfate, N-(3-sulfopropyl)-N-(meth)acrylamidopropyl-N,N-dimethylammonium betaine, vinylbenzyl trimethylammonium chloride, mixtures thereof, and the like.

A dispersing group may also be introduced into the vinyl copolymer using suitable polymer reactions. Examples of suitable polymer reactions to provide the dispersing group include: (1) reaction of succinic anhydride with a portion of the hydroxyl groups on a vinyl copolymer to produce a vinyl copolymer with pendant acid functionality; and (2) reaction of a tertiary amine with the epoxy groups on a vinyl copolymer to produce a vinyl copolymer with pendant quaternary ammonium groups. In order to provide a vinyl copolymer having a pendant epoxy groups for this reaction, nonhalogenated, epoxy functional vinyl monomers may be incorporated into the vinyl copolymer. Such monomers include, for example, glycidyl ether of an unsaturated alcohol such as allyl glycidyl ether, a glycidyl ester such as glycidyl (meth)acrylate, and the like.

Preferred vinyl copolymers of the present invention are copolymers of monomers comprising (meth)acrylonitrile; a nonhalogenated, hydroxyl functional, vinyl monomer as described above; a nonhalogenated, vinyl monomer bearing a dispersing group as described above; and one or more nonhalogenated, nondispersing, vinyl monomers. The term "nondispersing" means that the monomer bears no dispersing group and no hydroxyl group.

Representative examples of suitable copolymerizable, nonhalogenated, nondispersing, vinyl monomers include styrene; alkylated styrenes; alkoxy styrenes; vinyl naphthalene; alkylated vinyl naphthalenes; alkoxy vinyl naphthalenes; (meth)acrylamides; N-vinyl pyrolidone; linear, branched, or alicyclic alkyl esters of (meth)acrylic acid wherein the alkyl groups contain from 1 to 20, preferably 1–8, carbon atoms, such as methyl (meth)acrylate, n-butyl (meth)acrylate, t-butyl (meth)acrylate, ethyl (meth)acrylate, isopropyl (meth)acrylate, and 2-ethylhexyl (meth)acrylate; vinyl esters of alkanoic acids wherein the alkyl moiety of the alkanoic acids contain 2 to 20, preferably 2 to 4, carbon atoms and may be linear, branched, or alicyclic; isobornyl (meth)acrylate; glycidyl (meth)acrylate vinyl acetate; allyl (meth)acrylate, and the like. Preferred nonhalogenated, nondispersing, vinyl monomers include styrene, alkyl-substituted styrenes, alkyl (meth)acrylates wherein the alkyl group contains 1 to 4 carbon atoms, and mixtures thereof. Most preferably, the nonhalogenated, nondispersing, vinyl monomer is selected from styrene, methyl methacrylate, ethyl methacrylate, and mixtures thereof.

One particularly preferred nonhalogenated vinyl copolymer of the present invention (hereinafter referred to as the "Preferred Vinyl Copolymer") is a nonhalogenated vinyl copolymer of monomers comprising 5 to 40, preferably 20 to 35, parts by weight of (meth)acrylonitrile; 30 to 70 parts by weight of one or more nonhalogenated, nondispersing, vinyl monomers; 15 to 25 parts by weight of a nonhalogenated, hydroxyl functional, vinyl monomer; and 0.25 to 10, preferably 0.25 to 5, most preferably 0.25 to 2 parts by weight of a nonhalogenated, vinyl monomer bearing a dispersing group.

For the Preferred Vinyl Copolymer, the dispersing group is preferably selected from quaternary ammonium, acid or salt of carboxyl, acid or salt of phosphate or phosphonate, acid or salt of sulfate or sulfonate, and mixtures thereof. More preferably, the dispersing group is quaternary ammonium. When the dispersing group is quaternary ammonium, it is preferred that the vinyl monomer bearing a dispersing group is (meth)acryloyloxyethyl trimethylammonium chloride.

Preferably, the nonhalogenated, nondispersing, vinyl monomer of the Preferred Vinyl Copolymer is selected from styrene; an alkyl ester of (meth)acrylic acid wherein the alkyl group of the alkyl ester has 1 to 20 carbon atoms; and a blend comprising styrene and such an alkyl ester wherein the weight ratio of styrene to the alkyl ester is in the range from 10:90 to 90:10. For Preferred Vinyl Copolymers containing such an alkyl ester, the alkyl ester is preferably methyl (meth)acrylate, more preferably methyl methacrylate.

Nonhalogenated vinyl copolymers of the present invention may be prepared by free-radical polymerization methods known in the art, including but not limited to bulk, solution, emulsion and suspension polymerization methods. For example, according to the solution polymerization method, copolymers of the present invention are prepared by dissolving the desired monomers in an appropriate solvent, adding a chain-transfer agent, a free-radical polymerization initiator, and other additives known in the art, sealing the solution in an inert atmosphere such as nitrogen or argon, and then agitating the mixture at a temperature sufficient to activate the initiator.

Solvents useful in such polymerizations can vary according to solubility of the monomers and additives. Typical solvents include ketones such as acetone, methyl ethyl ketone, 3-pentanone, methyl isobutyl ketone, diisobutyl ketone, and cyclohexanone; alcohols such as methanol, ethanol, propanol, n-butanol, isopropanol, isobutanol, cyclohexanol and methyl cyclohexanol; esters such as ethyl acetate, butyl acetate, isobutyl acetate, isopropyl acetate, and the like; aromatic hydrocarbons such as benzene, toluene, xylenes, cresol, and the like; ethers such as diisopropyl ether, diisobutyl ether, tetrahydrofuran, tetrahydropyran, and dioxane; and aprotic solvents such as dimethylformamide, dimethylsulfoxide and the like, and mixtures thereof. The preferred solvent for preparation of the vinyl copolymers of the present invention is methyl ethyl ketone (MEK) because it is also the preferred medium in which the magnetic dispersions, described below, are prepared due to the ready solubility therein of polyurethane-vinyl copolymer blends.

Chain transfer agents suitable for solution polymerization include but are not limited to alcohols, mercaptans, certain halogenated small molecules, and mixtures thereof. Preferably, the chain transfer agent is chosen from the group consisting of carbon tetrabromide, isooctylthioglycolate, mercaptosuccinic acid, mercaptopropane diol, dodecyl mercaptan, ethanol and carbon tetrachloride. Most preferably, the chain transfer agent is mercaptopropane diol.

Free-radical polymerization initiators suitable for solution polymerization include those that are soluble in the reaction solvent and that are thermally activated, including but not limited to azo compounds, peroxides, and mixtures thereof. Useful peroxide initiators include those chosen from the group consisting of benzoyl peroxide, lauroyl peroxide, di-t-butyl peroxide and the like, and mixtures thereof. Useful azo compound initiators include those chosen from the group consisting of 2,2'-azobis(2-methylbutyronitrile); 2,2'-azobis(isobutyronitrile); and 2,2'-azobis(2,4-dimethylpentanenitrile); each of which is commercially available as VAZO 67, VAZO 64, and VAZO 52, respectively, from E. I. Du Pont de Nemours and Co. The preferred thermal polymerization initiator is the VAZO 64 brand initiator because of its ease of use and its half-life characteristics (e.g., at 64° C., half-life is 10 hours).

Nonhalogenated vinyl copolymers of the present invention may also be prepared by emulsion polymerization methods. Typically, an emulsion comprising vinyl monomers, a chain-transfer agent and a water-soluble redox-type initiator system is prepared in an inert atmosphere, then heated carefully until a reaction exotherm occurs. The reaction mixture is stirred and cooled and the resulting latex is collected. Optionally, an ionic or nonionic surfactant may be added to the reaction mixture. Oxidation—reduction ("Redox") free-radical initiators useful in the invention include but are not limited to those chosen from the group consisting of tertiary amines with organic peroxides (exemplified by the N, N-diethylaniline—benzoyl peroxide pair); organic halides with transition metal complexes (exemplified by the carbon tetrachloride—molybdenum hexacarbonyl pair); inorganic oxidation—reduction systems (exemplified by the potassium persulfate—sodium metabisulfite pair); and organic—inorganic systems (exemplified by the 2-mercaptoethanol—$Fe^{+3}$ pair). Inorganic redox initiators are preferred for the copolymers of the invention because of their ease of handling and useful reaction temperature range.

The carboxy-functional polyurethane of the magnetic layer preferably is derived from reactants comprising a polydiol, a carboxy-functional diol, a diisocyanate, and optionally a chain extender. A triol such as glycerol, trimethylolpropane, polycaprolactone triols, etc. may also optionally be used. The carboxy-functional polymer desirably has a number of pendant carboxy groups sufficient to help disperse the magnetic pigment. Generally, providing the carboxy-functional polyurethane with a carboxy equivalent weight in the range from 2000 to 50,000, preferably 5,000 to 50,000, more preferably 10,000 to 30,000 has been found to be suitable in the practice of the present invention. The carboxy-functional polyurethane also desirably has suitable number average and weight average molecular weights to provide a magnetic layer with excellent processability, modulus, durability, electromagnetic performance, and the like. Generally, providing a carboxy-functional polyurethane with a weight average molecular weight in the range from 10,000 to 100,000, preferably 20,000 to 75,000, more preferably about 50,000, and a number average molecular weight in the range from 5,000 to 50,000, preferably 8,000 to 40,000, more preferably 10,000 to 30,000, has been found to be suitable in the practice of the present invention. In the practice of the present invention, molecular weight is determined by GPC analysis.

One specific example of a carboxy-functional polyurethane found to be suitable in the practice of the present invention is derived from reactants comprising 20 to 80, preferably 30 to 60, and most preferably 40 parts by weight of the polydiol, 0 to 20, preferably 5 to 20, and most preferably 15 parts by weight of a chain extender, 0.5 to 10, preferably 0.5 to 5, and most preferably 1 parts by weight of the carboxy-functional diol, and 30 to 60, preferably 40 to 50, and most preferably 45 parts by weight of the diisocyanate.

According to one approach for making the carboxy-functional polyurethane, the reactants, e.g., the polydiol, the diisocyanate, the chain extender if any, and the carboxy-functional diol, are combined in a suitable, nonaqueous solvent and allowed to react at the reflux temperature of the solvent. The amount of solvent used is not critical so long as a sufficient amount of the solvent is used so that substantially all of the reactants dissolve in the solvent. Generally, using a sufficient amount of solvent such that the reaction mixture contains 30 to 80 weight percent of solvent has been found to be suitable in the practice of the present invention. A catalyst such as dibutyltindilaurate may be added to the reaction mixture in order to accelerate the reaction. Generally, using 0.01 to 0.2 parts by weight of the catalyst based on 100 parts by weight of the carboxy-functional polyurethane has been found to be suitable in the practice of the present invention. Examples of suitable solvents for carrying out the reaction include tetrahydrofuran (THF), toluene, and methyl ethyl ketone (MEK). The progress of the reaction may be monitored by measuring the IR absorption (2250 cm$^{-1}$) of the NCO groups from the diisocyanate. The reaction is deemed to be complete when an IR absorption for these NCO groups can no longer be detected.

In order to minimize the amount of water that is present in the reaction mixture, it is preferred that any polyols used to make the carboxy-functional polyurethane be dried before being combined with the other reactants. The particular technique used to dry the polyols is not critical and may be any suitable drying technique known in the art.

Examples of diisocyanates suitable for preparing the carboxy-functional polyurethane of the present invention may be characterized by the formula

OCN—R$_1$—NCO wherein R$_1$ is a divalent, organic linking group. The nature of the linking group R$_1$ is not critical in the practice of the present invention, so long as R$_1$ is substantially unreactive to isocyanate groups, amine groups, and OH groups under the reaction conditions employed to react the diisocyanate with the other reactants used to prepare the carboxy-functional polyurethane. Examples of structures suitable for R$_1$ include substituted or unsubstituted straight chain, branched chain, or cyclic alkylene, arylene, aralkylene, alkoxy, acyloxy, and the like.

Preferred examples of specific diisocyanates suitable in the practice of the present invention include isophorone diisocyanate; methylene-bis-(4-cyclohexylisocyanate); tetramethylene diisocyanate; 1,3- and 1,4-cyclohexyl diisocyanate; 1,6-hexamethylene diisocyanate; isomers of tetramethylxylene diisocyanate; 4,4'-diphenylmethane diisocyanate (MDI); 2,4-toluene diisocyanate; and the like. Of these materials, MDI is preferred.

Examples of chain extenders suitable for making the carboxy-functional polyurethane of the present invention include dinucleophiles having a molecular weight of about 200 or less that are capable of reacting with the diisocyanate to form part of the hard segments of the carboxy-functional polyurethane. Examples of chain extenders suitable in the practice of the present invention may be characterized by the formula

X—R$_2$—Y wherein R$_2$ is a divalent, organic linking group. The nature of the linking group R$_2$ is not critical in the practice of the present invention, so long as R$_2$ is substantially unreactive to isocyanate groups, amine groups, and OH groups under the reaction conditions employed to react the chain extender with the other reactants used to prepare the carboxy-functional polyurethane. Examples of structures suitable for R$_2$ include substituted or unsubstituted straight chain, branched chain, or cyclic alkylene, arylene, aralkylene, alkoxy, acyloxy, and the like. Each of X and Y is independently a hydroxy, amino, or mercapto moiety, or the like.

Preferably the chain extender is a short-chain diol such as ethylene glycol, propylene glycol, butane diol, 1,6-hexane diol, 2-ethylhexane diol, 2-butene-1,4-diol, diethylene glycol, 1,4-cyclohexanedimethanol, 2-butyl-2-ethyl-1,3-propane diol, 2,2-dimethyl-1,3-propane diol (neopentyl glycol), and the like. Of these materials, neopentyl glycol is most preferred.

Polydiols suitable for making the carboxy-functional polyurethane of the present invention include diols that have a molecular weight of at least 200, and more preferably have a molecular weight in the range from 500 to 3000. Examples of polydiols suitable in the practice of the present invention may be characterized by the formula

HO—R$_3$—OH wherein R$_3$ is a divalent, organic linking group. The nature of the linking group R$_3$ is not critical in the practice of the present invention, so long as R$_3$ is substantially unreactive to isocyanate groups, amine groups, and OH groups under the reaction conditions employed to react the polydiol with the other reactants used to prepare the carboxy-functional polyurethane. Examples of structures suitable for R$_3$ include substituted or unsubstituted straight chain, branched chain, or cyclic alkylene, arylene, aralkylene, alkoxy, acyloxy, and the like. The carboxy-functional polyurethane contains 20 to 80, and more preferably 40 to 60, weight percent of the polydiol.

Preferred examples of suitable polydiols include polyester diols, polycaprolactone diols, polycarbonate diols, polydimethylsiloxane diols, polyether diols, polyolefin diols, and the like. Representative polyester diols include polyester diols prepared by the polymerization of an aliphatic dicarboxylic acid or anhydride with a glycol. Examples of aliphatic dicarboxylic acids include, for example, adipic acid, succinic acid, pimelic acid, suberic acid, azelaic acid, sebacic acid, and the like or their anhydrides. The phthalic acids and their anhydrides are also useful in the practice of the present invention. The glycols used in the preparation of the polyesters include aliphatic diols containing between 2 and 10 carbon atoms, usually 2 to 6 carbon atoms, such as ethylene glycol, propylene glycol, butane diol, hexamethylene diol, decamethylene diol, 2-ethylhexane diol, 2,6-dimethyl-1,3-propane diol, and the like.

Representative polyether diols, also referred to as poly (alkylene oxides), are essentially hydroxyl-containing compounds having ether linkages. Examples of polyether diols include hydroxyl-terminated poly(propylene oxide), hydroxyl-terminated poly(tetramethylene oxide), hydroxyl-terminated poly(ethylene oxide), hydroxyl-terminated poly (1,2-butylene oxide), tetrahydrofuran, ethylene oxide copolyethers, and the like.

A particularly useful class of polydiols is the class of hydroxyl-terminated poly(caprolactone) diols commercially available under the tradename Tone from Union Carbide Corp. These polydiols have molecular weights ranging from about 500 to about 3000.

The carboxy-functional diol is a diol having at least one pendant —COOH group. A representative example of such diols is dimethyl propionic acid (DMPA).

When preparing the carboxy-functional polyurethane, the diisocyanate is used in an amount such that the ratio of NCO groups from the diisocyanate to the total number of NCO-reactive moieties, e.g., OH groups, provided by the other reactants is less than 1, and more preferably is in the range from 0.8 to 0.99. In the practice of the present invention, the nucleophilic moieties of the chain extender, e.g., the moieties given by X or Y in the formula X—R$_2$—Y, are deemed to be hydroxy groups for purposes of calculating this ratio.

As one example of a process for preparing a magnetic layer or backside coating of the present invention, the components of the magnetic layer or backside coating, as appropriate, are combined and mixed with a suitable solvent to form a substantially homogeneous dispersion. Useful solvents are those which are capable, alone or in the presence of other additives such as wetting agents, of dispersing the polymeric binder and magnetic or nonmagnetic pigments, and which evaporate upon heating to leave behind the dried coating. Such solvents include, for example, toluene, methyl ethyl ketone (MEK), tetrahydrofuran (THF), cyclohexanone, methyl isobutyl ketone, xylene, or combinations thereof. For the purposes of the present invention, the solvent comprises all solvents that are part of the dispersion, whether added as a solvent with another ingredient, or added separately.

To prepare the dispersion, the ingredients are combined and milled until a substantially smooth dispersion is obtained. In the case of the backside coating, milling time has been observed to affect the surface roughness of the resulting backside coating. Generally, a longer milling time provides a smoother coating. For example, milling the backside dispersion in a horizontal sand mill for between 6 and 12 passes has been found to be effective. Generally, a preferred coating operation comprises a coating station, a drying oven, and means to support and transport the substrate through the operation. After the dispersion has been prepared, the dispersion is coated onto a major surface of the nonmagnetic substrate. Any method of coating a backside or magnetic dispersion onto a substrate can be used in the practice of the present invention. Useful coating techniques are, for example, gravure coating, knife coating, curtain coating, and the like. In the case of the magnetic layer, the coated magnetic dispersion may then be passed through a magnetic field to orient the magnetic pigment after which the coating is dried, calendered if desired, and then allowed to cure. A similar series of steps can be followed for drying, calendering if desired, and curing the backside coating.

The magnetic layer may be coated onto one surface of the substrate either before or after the backside coating is coated onto the opposite side of the substrate. The resulting magnetic recording medium can be slit to an appropriate width for use in high speed contact duplication.

Curing of the backside coating and/or the magnetic layer can be accomplished in a variety of ways. As one approach, the isocyanate crosslinking agent can be added to the dispersion just before the dispersion is coated onto the substrate. As soon as the isocyanate crosslinking agent is added to the dispersion, the NCO groups of the isocyanate crosslinking agent will begin to react with the hydroxyl groups, if any, of the polymeric binder. Preferably, a catalyst, e.g., dibutyltindilaurate, may also be added in suitable catalytic amounts in order to facilitate this crosslinking reaction. Generally, using from 0.02 to 0.2 parts by weight of catalyst per 13 parts by weight of crosslinking agent has been found to be suitable in the practice of the present invention.

As another approach, when one or more components of the polymeric binder contain radiation curable moieties, the dried coating may be irradiated to achieve curing of the radiation curable materials. Irradiation may be achieved using any type of ionizing radiation, e.g., electron beam radiation or ultraviolet radiation, in accordance with practices known in the art. Preferably, radiation curing is achieved with an amount of electron beam radiation in the range from 1 to 20 Mrads, preferably 4 to 12 Mrads, and more preferably 5 to 9 Mrads of electron beam radiation having an energy in the range from 100 to 400 keV, preferably 200 to 250 keV. Although electron beam irradiation can occur under ambient conditions or in an inert atmosphere, it is preferred to use an inert atmosphere as a safety measure in order to keep ozone levels to a minimum and to increase the efficiency of curing. "Inert atmosphere" means an atmosphere comprising nitrogen or a noble gas and having an oxygen content of less than 500 parts per million ("ppm"). A preferred inert atmosphere is a nitrogen atmosphere having an oxygen content of less than 75 parts per million.

The present invention will now be further described with reference to the following examples.

EXAMPLES

Example 1

Five samples of magnetic tape were prepared using the magnetic and backside dispersion formulations shown in the following tables.

| Magnetic Dispersion Ingredient | I (1A/1B) parts by weight solids | II (1C/1D/1E) parts by weight solids |
|---|---|---|
| Co-γ-Fe$_2$O$_3$ Magnetic Pigment (Toda) | 100 | 100 |
| Al$_2$O$_3$ (Norton Co.) | 5 | 5 |
| Phosphorylated Polyoxyalkyl Polyol Wetting Agent (described in U.S. Pat. No. 5,028,483, col. 5) (PPP) | 3 | 2 |
| EMCOL Phosphate Wetting Agent (U.S. Pat. No. 5,028,483) | 3 | 2 |
| VAGH Vinyl Chloride Copolymer Binder (Union Carbide) | 3.12 | 2.51 |
| Hydroxy-functional polyester polyurethane Binder (U.S. Pat. No. 4,693,390, col. 7, lines 17–22) | 9.34 | 7.54 |
| Myristic Acid | 0.7 | 0.7 |
| Butyl Myristate | 1.5 | 1.5 |
| Mondur CB-601 Crosslinking Agent (Miles Inc.) | 4.65 | 4.65 |

Magnetic Dispersions I and II differ significantly in that Magnetic Dispersion I is 76.74 percent by weight magnetic pigment and 4.6 percent by weight low molecular weight dispersing agent while Magnetic Dispersion II has 79.43 percent by weight magnetic pigment and only 3.18 percent by weight low molecular weight dispersing agents. These factors combine to make Magnetic Dispersion II more porous than Magnetic Dispersion I. The lube absorption of tapes coated with Magnetic Dispersion I was about 4.5, while the lube absorption of tapes coated with Magnetic Dispersion II was from 6 to 7.

The $Al_2O_3$ was predispersed and premilled in a blend of MEK, toluene, and cyclohexanone (65/19/16)solvents at approximately 70 percent solids with 0.26 parts by weight of the PPP. The magnetic pigment, remaining PPP, Emcol phosphate, hydroxy-functional polyurethane, vinyl chloride copolymer were mixed under high shear with MEK/toluene/cyclohexanone (58/21/21) solvent blend at about 46 percent solids and milled in a horizontal sand mill for sufficient time to produce a smooth dispersion which was then filtered. A smooth dispersion is defined as being substantially homogeneous and free of agglomerates when visually inspected. The predispersed $Al_2O_3$ was then mixed with the dispersion and the resulting mixture was diluted to 38 percent solids with MEK/toluene (75/25) solvent blend for coating. The myristic acid, butyl myristate and Mondur CB-601 were added to the dispersion just prior to coating and the mixture was then filtered.

| Backside Dispersion Ingredient | I (1A/1B) parts by weight solids | II (1C/1D) parts by weight solids | III (1E) parts by weight solids |
|---|---|---|---|
| Acetylene Carbon Black (Chevron Chemical Co.) 0.05–0.20 μm | 40 | — | — |
| Thermax N-991 Medium Thermal Carbon Black (Cancarb, Ltd.) 0.40–0.80 μm | 10 | — | 10 |
| VULCAN XC-72 Carbon Black (Cabot Corp.) 0.03–0.15 μm | — | 40 | 40 |
| R-101 $TiO_2$ (E.I. Dupont de Nemours and Co.) 0.3–0.7 μm | — | 10 | — |
| Lecithin | 4 | 3 | 3 |
| Hydroxy-functional polyester polyurethane Binder (U.S. Pat. No. 4,693,390, col. 7, lines 17–22) | 32.15 | 32.65 | 32.65 |
| Phenoxy YP-50s (Tohto-Kasei Co.) | 13.8 | 14.3 | 14.3 |
| Dibutyltindilaurate | 0.05 | 0.05 | 0.05 |
| Myristic Acid | 0.25 | 0.25 | 0.25 |
| Papi 2027 Isocyanate Crosslinking Agent (The Dow Chemical Co.) | 12.9 | 12.9 | 12.9 |

For Backside Dispersiion I, sample 1A, the nonmagnetic pigments, lecithin, catalyst, hydroxy-functional polyurethane and phenoxy YP-50s were mixed with MEK/toluene/cyclohexanone (60/35/5) solvent blend at about 18 percent solids in a high speed mixer and then milled in a horizontal sand mill with 1.3 mm steel media for 6 passes. Then the dispersion was diluted to about 10 percent solids with MEK/toluene (75/25) solvent blend for coating. The myristic acid and Papi 2027 Isocyanate were added to the dispersion just prior to coating and the mixture filtered. Similar procedures were used for the other dispersions but the number of milling passes varied. Backside Dispersion I, sample 1B, and Backside Dispersion III were milled for more than 18 passes. Backside Dispersion II, samples 1C and 1D were milled for 6 and 12 passes, respectively.

Samples 1A and 1B are comparative samples having relatively larger-sized nonmagnetic pigments in the backside coating.

For each sample, the magnetic dispersion was applied to a 14 micron (0.56 mil) biaxially oriented polyethyleneterephthalate film using a rotogravure coating apparatus. The coated film was magnetically oriented, passed through an oven set at 62° C. to drive off volatile materials, and immediately calendered to provide a smooth magnetic recording surface. Simultaneously, the backside coating was applied to the surface of the film opposite the magnetic layer.

The samples were slit in 1.26 cm (0.498 in) tape widths and tested for surface roughness of the backside coating, RF output, luminance signal to noise ratio, track centering, RF instability (RFI), tape tension, and high speed dynamic friction. Surface roughness was tested using a Wyko Rough Surface Topography Interferometer. RF output, luminance signal to noise ratio, track centering, and RFI were all measured on an Aerosonic Model 9100 testing apparatus using tape which had been duplicated from an Extended Play (EP) master tape on an HSP 5000 Sprinter (Sony). Track centering refers to percent failure of the pre-programmed Auto Tracking Test on an Aerosonic Model 9100. Tape tension was measured by running the tape for 100 passes in a Panasonic A6-6200 video cassette recorder while measuring the tension in the tape at the takeup inertia roller using a Model T2-87H7-UM Tentelometer (Tentel). The high speed dynamic friction test was conducted as described previously. In addition, tests were run on a commercially available high speed contact duplication copy tape having no backside coating, as a control.

Results are shown in the table below. The results for RF output and signal to noise are shown as the difference from the results for the commercially available control tape. The control tape also showed a tape tension of 80–90 g and a percent failure in track centering of 10 percent. RFI (RF instability) is determined by charting the RF output level and calculating the change in RF output from its peak value. Low values of RFI indicate that the master tape and copy tape were well aligned during high speed contact duplication. Backside slippage and magnetic/backside slippage ratios were determined as discussed above.

| Sample | Magnetic dispersion | Backside dispersion | Backside milling [No. passes] | RF output [dB] | Signal to noise [dB] | Track centering [% fail] | Tape tension [g] | Backside roughness [nm] | RFI [dB] | Backside slippage [%] | Magnetic/ backside slippage ratio |
|---|---|---|---|---|---|---|---|---|---|---|---|
| 1A Comparative | I | I | 6 | −0.2 | −1.0 | 20.8 | 100 | 169 | −2.6 | 93% | 0.88 |
| 1B Comparative | I | I | 18+ | 0.4 | 0.4 | 6 | 125 | 66 | −0.8 | 67.5% | 1.19 |
| 1C | II | II | 6 | 0.2 | 0.1 | 6 | 84 | 82 | −1.4 | 81% | 0.99 |
| 1D | II | II | 12 | 0.4 | 0.3 | 6 | 83 | 15 | — | — | — |
| 1E | II | III | 18 | 0.3 | 0.0 | 6 | 85 | 116 | −0.6 | 83% | 0.94 |

Samples 1A and 1B having Backside Dispersion I both exhibit high tape tension. Sample 1B which was milled for 18+ passes shows lower backside roughness than Sample 1A, and correspondingly improved RF output, signal to noise ratio and track centering. Samples 1C and 1D, having Backside Dispersion II show much improved tape tension while still exhibiting good results in other testing. Sample 1E, substituting carbon black for $Ti_{O2}$ as the larger-sized nonmagnetic pigment in the backside dispersion, shows higher backside roughness but acceptable performance results.

Example 2

Four samples of magnetic recording media were prepared using the following formulations.

| Charge | Magnetic Dispersion Ingredient | 2A | 2B | 2C | 2D |
|---|---|---|---|---|---|
| | | parts by weight solution | | | |
| A | Co-modified Iron Oxide Magnetic Pigment | 14 | 25 | 25 | 14 |
| | Phosphorylated Polyoxyalkyl Polyol [PPP] Dispersing Agent (See U.S. Pat. No. 5,028,483 at col. 5) (75% solids in toluene) | — | 1 | 1 | — |
| | EMCOL Phosphate Dispersing Agent (Witco) | — | 0.8 | 0.8 | — |
| | Sulfonated Polyester Urethane Binder (35% solids in MEK) (See U.S. Pat. No. 5,069,807, col. 14) | 2.6 | — | — | 2.6 |
| | MR113 epoxy functional vinyl chloride copolymer (Nippon Zeon Co. Ltd.) | 0.9 | — | — | 0.9 |
| | VAGH Vinyl Chloride Resin Binder (Union Carbide Corp.) (31.6% solids in MEK) | — | 2.4 | 2.4 | — |
| | Hydroxy-functional polyester polyurethane Binder (U.S. Pat. No. 4,693,390, col. 7, lines 17–22) (30% solids in MEK/cylcohexanone) | — | 7.5 | 7.5 | — |
| | MEK | 8.4 | 5.2 | 5.2 | 8.4 |
| | Toluene | 2.8 | 14.2 | 14.2 | 2.8 |
| | Cyclohexanone | — | 9.4 | 9.4 | — |
| B | Norton 330 Predispersed Alumina (65% solids in MEK, toluene, and cyclohexanone) (Norton Industries) | 1.3 | — | — | 1.3 |
| | MEK | 7.2 | 13.8 | 13.8 | 7.2 |
| | Toluene | 2.4 | — | — | 2.4 |
| | | g/lb dispersion | | | |
| C | Butyl Myristate Lubricant | 0.2 | 0.4 | 0.4 | 0.2 |
| | Myristic Acid Lubricant | 0.1 | 0.2 | 0.2 | 0.1 |
| | MONDUR CB-601 Crosslinking Agent (Miles Inc.) (60% solids in PM Acetate) | 0.5 | 1.6 | 1.6 | 0.5 |

To prepare the magnetic dispersion, Charge A was mixed for 2 hours in a high shear mixer and milled in a horizontal sand mill until smooth. Charge B was then mixed with the dispersion, giving a mixture at approximately 38 percent solids. Just prior to coating, charge C was added to the mixture, followed by 10 minutes of high speed mixing.

| Charge | Backside Dispersion Ingredient | 2A | 2B | 2C | 2D |
|---|---|---|---|---|---|
| | | Parts by Weight Solution | | | |
| A | Vulcan Xc-72 Carbon Black (Cabot Corp.) 0.03–0.15 μm | — | — | 40 | 40 |
| | Thermax Carbon Back (Cancarb Ltd.) 0.40–0.80 μm | 15.7 | 15.7 | — | — |
| | Hydroxy-functional polyester polyurethane Binder (U.S. Pat. No. 4,693,390, col. 7, lines 17–22) (25% solids in MEK) | 50.1 | 50.1 | — | — |
| | YP-50s Phenoxy Resin Binder (Tohto-Kasei Co.) (30% solids in MEK) | 17.9 | 17.9 | — | — |
| | FM 200S Nitrocellulose (Daicel Chemical Industries, Ltd.) (28% solids in MEK) | — | — | 48.2 | 48.2 |
| | UR8700 polyurethane (Toyobo Co., Ltd.) (30% solids in MEK) | — | — | 75 | 75 |
| | MEK | 118.3 | 118.3 | 478.6 | 478.6 |
| | Toluene | 42.6 | 42.6 | — | — |
| | Cyclohexanone | 14.1 | 14.1 | — | — |
| | | g/lb dispersion | | | |
| B | Myristic Acid Lubricant | 0.1 | 0.1 | — | — |
| | Mondur CB-601 Crosslinking Agent (Miles Inc.) (60% solids in PM Acetate) | — | — | 24.9 | 24.9 |
| | Papi 2027 Icoscyanate Crosslinking Agent (The Dow Chemical Co.) | 4.2 | 4.2 | — | — |

To prepare the backside dispersion, the ingredients of Charge A were mixed for 2 hours in a high shear mixer, and then milled in a horizontal sand mill until smooth. At the time of coating, Charge B was added to the dispersion, followed by 5 minutes of high speed mixing.

The magnetic dispersion was applied to a 14 micron (0.56 mil), biaxially-oriented polyethylene terephthalate (PET) film at approximately 2.75 μm (110 microinches) dry coating thickness. The coated film was magnetically oriented, dried in an oven at 140° to 170° F. (60°–77° C.). The backside coating was then applied to the surface of the film opposite the magnetic layer in a second coating pass, and subsequently dried. The resulting magnetic recording medium was then calendered at 160 kg/cm (900 pli) and 52° C. (125° F.) and slit to 1.27 cm (0.5 inch) tape widths. Samples 2A and 2D were designed to have a higher level of porosity in magnetic layer.

Samples 2A, 2B, 2C and 2D were then tested for porosity, magnetic layer surface roughness, tape stiffness and RF output of tape duplicated at high (4.5 m/sec) and low (0.45 m/sec) speeds. Porosity was measured by the lubricant absorption test and also by a porosimetry test. In the porosimetry test, the pore volume of the tape is measured as a function of physical absorption of nitrogen gas at the surface and pores of the tape using an ASAP 2000 tester from Micromeritics Instrument Corp. A sample tape having only a backside coating was also tested, revealing that the pore volume of the backside coating is an order of magnitude less than that of the magnetic layer. The total pore volume of the tape is therefore considered to be a good estimate of the pore volume of the magnetic layer of the tape. Tape stiffness was measured by a loop stiffness test. In this test, an 11.5 cm×1.27 cm sample of tape is cut. The ends of the sample are brought together to form a loop which is then clamped into a holder. The holder is loaded into a test apparatus, by which the tape loop is then lowered a fixed vertical distance onto a force transducer. The transducer, attached to an MTM 106G tensiometer (Lion Precision Corp.), measures the amount of forced needed to deflect the tape loop by approximately 1.5 cm. The force is displayed in grams after a period of approximately one second.

A large decrease of RF output after high speed duplication ($RF_{high}$) when compared to RF output after low speed duplication ($RF_{low}$) is felt to indicate that an air film is being trapped between the master tape and copy tape during high speed duplication. The slow duplicating speed is intended to be a condition under which little or nor air entrapment will occur. The results are shown in the table below. RF loss is defined as $RF_{low}-RF_{high}$.

| Test | 2A | 2B | 3C | 2D |
|---|---|---|---|---|
| Lubricant absorption | 7 | 3 | 3.5 | 7 |
| Nitrogen Porosimetry [cc/g of tape] | 0.0218 | 0.009 | — | — |
| Tape Roughness [nm] | 6.2 | 7.8 | 7.0 | 4.9 |
| Tape Stiffness [g] | 0.14 | 0.12 | 0.13 | 0.16 |
| RF Loss [dB] | 0 | 2.7 | 1.6 | 0.4 |

Samples 2A and 2D have higher porosity in the magnetic layer than samples 2B and 2C. and display much less RF loss.

Example 3

(Preparation of polyesterurethane with pendant carboxylic acid wetting group)

972.8 gms (2.289 equivalents) Tone™ 0210 polycaprolactone diol (Union Carbide Corp.), 324.9 gm (6.248 eqs.) neopentyl glycol, 6.5 gms (0.247 eqs) dimethylol propionic acid (DMPA), 5628 gms methyl ethyl ketone (MEK), 1 gm dibutyltindilaurate, and 10,997.9 gms (8.784 eqs) diphenylmethane diisocyanate (MDI) were added to a 12 liter flask. The flask was heated to 75° C. for about 24 hours until no isocyanate was present, as determined by infrared spectroscopy. The final inherent viscosity was 0.45 and the calculated acid equivalent weight was 20,000.

(Preparation of magnetic tapes)

The magnetic dispersions set forth in the following table were prepared by combining in a clean Shar mixer the magnetic pigment, the hard resin in MEK solvent, and 40 percent by weight of the soft resin in MEK solvent with an MEK/toluene (75/25) solvent blend. The combination was slowly mixed for about two hours with cooling water flowing around the mixer. After the mixing period, the pre-mix was sampled for solids content. When the solids content was about 40–42 percent the premix was passed through a horizontal sandmill with 1.3 mm stainless steel media until the dispersion was free of agglomerates when viewed under 200 times magnification. The remaining 60 percent of the soft resin and other ingredients were added and milling continued until the dispersion was visually observed to be smooth and free of agglomerates under 200 times magnification. The solids content of the final dispersion was about 38–40 percent.

| DISPERSION FORMULATIONS | | | | | | | |
|---|---|---|---|---|---|---|---|
| INGREDIENTS (parts by weight solids) | 3A | 3B | 3C | 3D | 3E | 3F | 3G |
| MEK | 29.35 | 44.94 | 43.29 | 44.37 | 44.98 | 43.85 | 44.44 |
| Toluene | 18.05 | 15.02 | 16.6 | 14.79 | 14.97 | 14.62 | 14.81 |
| Cyclohexanone | 11.41 | — | — | — | — | — | — |
| PM Acetate | 0.91 | 0.89 | 0.76 | 0.91 | 0.98 | 0.93 | 0.90 |
| Phosphorylated polyoxyalkyl polyol Dispersant (see U.S. Pat. No. 5,028,483 at col. 5) | 0.92 | — | 0.62 | — | — | — | — |
| EMCOL Phosphate Dispersant (U.S. Pat. No. 5,028,483) | 0.92 | — | — | — | — | — | — |
| Cobalt Doped γ-Fe₂O₃ Magnetic Pigment | 30.68 | 30.80 | 31.17 | 31.4 | 30.65 | 31.97 | 31.42 |
| Chromium Dioxide (BASF) | — | — | — | — | — | — | 1.57 |
| HARD RESIN: | | | | | | | |
| Amount | 0.92 | 2.17 | 1.85 | 2.21 | 2.16 | 2.24 | 2.20 |
| (Type) | (A) | (B) | (B) | (B) | (B) | (C) | (B) |
| SOFT RESIN: | | | | | | | |
| Amount | 2.76 | 2.17 | 1.85 | 2.21 | 2.16 | 2.24 | 2.20 |
| (Type) | (D) | (E) | (E) | (F) | (G) | (H) | (E) |
| ALUMINA | 1.86 | 1.66 | 1.68 | 1.7 | 1.66 | 1.73 | — |
| MYRISTIC ACID Lubricant | 0.22 | 0.40 | 0.41 | 0.41 | 0.40 | 0.42 | 0.41 |
| BUTYL MYRISTATE Lubricant | 0.47 | 0.62 | 0.63 | 0.63 | 0.62 | 0.64 | 0.67 |
| MEK | 29.35 | 44.94 | 43.29 | 44.37 | 44.98 | 43.85 | 44.44 |
| Toluene | 18.05 | 15.02 | 16.6 | 14.79 | 14.97 | 14.62 | 14.81 |
| Cyclohexanone | 11.41 | — | — | — | — | — | — |
| PM Acetate | 0.91 | 0.89 | 0.76 | 0.91 | 0.98 | 0.93 | 0.90 |
| Phosphorylated polyoxyalkyl polyol Dispersant (see U.S. Pat. No. 5,028,483 at col. 5) | 0.92 | — | 0.62 | — | — | — | — |
| EMCOL Phosphate Dispersant (see U.S. Pat. No. 5,028,483) | 0.92 | — | — | — | — | — | — |
| Cobalt Doped γ-Fe₂O₃ Magnetic Pigment | 30.68 | 30.80 | 31.17 | 31.4 | 30.65 | 31.97 | 31.42 |
| Chromium Dioxide (BASF) | — | — | — | — | — | — | 1.57 |
| HARD RESIN: | | | | | | | |
| Amount | 0.92 | 2.17 | 1.85 | 2.21 | 2.16 | 2.24 | 2.20 |
| (Type) | (A) | (B) | (B) | (B) | (B) | (C) | (B) |
| SOFT RESIN: | | | | | | | |
| Amount | 2.76 | 2.17 | 1.85 | 2.21 | 2.16 | 2.24 | 2.20 |
| (Type) | (D) | (E) | (E) | (F) | (G) | (H) | (E) |
| ALUMINA | 1.86 | 1.66 | 1.68 | 1.7 | 1.66 | 1.73 | — |
| MYRISTIC ACID Lubricant | 0.22 | 0.40 | 0.41 | 0.41 | 0.40 | 0.42 | 0.41 |
| BUTYL MYRISTATE Lubricant | 0.47 | 0.62 | 0.63 | 0.63 | 0.62 | 0.64 | 0.67 |

Resin "A" is VAGH Vinyl Chloride copolymer (Union Carbide Corp).

Resin "B" is a non-halogenated vinyl copolymer, copending application U.S. Pat. No. 5,510,187, Apr. 27, 1993, page 27, Example 1a.

Resin "C" is MR113 Sulfonated Hydroxy Epoxy-functional Vinyl Chloride Copolymer (Nippon Zeon Co., Ltd.)

Resin "D" is the Polyesterurethane used in Scotchbrand VHS T-120.

Resin "E" is a polyurethane with pendant Amino-1,3,4-thiadiazole-2-thione. (See U.S. Pat. No. 5,081,213).

Resin "F" is the polyesterurethane with pendant carboxylic acid wetting group prepared in Example 3.

Resin "G" is a polyurethane with pendant mercaptosuccinic Acid group. Example 3 U.S. Pat. No. 5,498,685.

Resin "H" is a polyurethane with pendant sulfonated hydroxy-functional polyurethane. (See U.S. Pat. No. 5,069,807, Col. 14.)

The lubricants and curing agents were added to the above dispersions immediately before knife coating the dispersions on a PET film. A backside formulation as shown in examples 2A and 2B was applied to the opposite side of the PET film. A magnetic field was applied to the coated film to align the magnetic particles. After this orientation, the coating was dried and allowed to complete the curing. The dried, cured tape was slit to the proper width for test evaluations.

The tapes were tested for coercivity ($H_c$), the field strength required to bring the flux density to zero in a magnetic material; goodness number (Gn), a dimensionless measure of coercivity given by the coercivity divided by the width of the coercivity at ½ peak height; retentivity ($B_r$), which is the maximum value of residual flux density corresponding to saturation flux density; squareness (see U.S. Pat. No. 5,081,213, col. 11); and caliper. Coercivity, retentivity, and goodness numbers were obtained from measurements taken from the display of magnetic hysteresis loop with the field strength at 3,000 Oe maximum of a 60 Hz magnetometer. Results are shown in the following table.

| Sample | $H_c$ [Oe] | Gn | $B_r$ [gauss] | Squareness | Magnetic Layer Caliper [μm] | Backside Coating Caliper [μm] |
|---|---|---|---|---|---|---|
| 3A | 704 | 2.27 | 1717 | 0.83 | 2.1 | 0.6 |
| 3B | 738 | 2.16 | 1627 | 0.83 | 2.2 | 0.8 |
| 3C | 715 | 2.03 | 1622 | 0.82 | 2.2 | 0.6 |
| 3D | 765 | 2.24 | 1580 | 0.85 | 2.3 | 0.6 |
| 3E | 750 | 2.15 | 1607 | 0.83 | 2.0 | 0.6 |
| 3F | 751 | 2.13 | 1694 | 0.83 | 2.1 | 0.6 |
| 3G | 768 | 2.22 | 1740 | 0.84 | 2.1 | 0.6 |

The tapes were also tested for physico-mechanical properties including Young's modulus, hardness on a Csiro Nanoindenter at 1 mN indentation force and 10 micron indenter diameter, lubricant absorption, surface roughness (Rq) and stop motion, also known as still mode, which is a test for durability of a video tape in which a rotating head is run on a tape locked in the pause mode of a video recorder. Results are shown in the table below.

| Sample | Modulus [MPa] | Hardness [MPa] | Lubricant Absorption | Surface Roughness [nm] | Stop Motion [min] |
|---|---|---|---|---|---|
| 3A | 11962 | 98 ± 2 | 3.8 | 8.8 | 134 |
| 3B | 14556 | 99 ± 5 | 4.8 | 7.3 | 125 |
| 3C | 13194 | 107 ± 5 | 3.8 | 7.3 | 180 |

-continued

| Sample | Modulus [MPa] | Hardness [MPa] | Lubricant Absorption | Surface Roughness [nm] | Stop Motion [min] |
|---|---|---|---|---|---|
| 3D | 17734 | 109 ± 4 | 5.8 | 7.5 | 141 |
| 3E | 13007 | 98 ± 2 | 4.9 | 6.8 | 140 |
| 3F | 10618 | 89 ± 3 | 5.8 | 7.4 | 77 |
| 3G | 15258 | 101 ± 4 | 5.5 | 6.3 | 140 |

Tape 3D, which contained the polyesterurethane resin, as prepared above with the carboxylic acid wetting group, displayed an excellent balance of properties: good hardness and modulus, while retaining good porosity and surface smoothness.

Other embodiments of this invention will be apparent to those skilled in the art upon consideration of this specification or from practice of the invention disclosed herein. Various omissions, modifications, and changes to the principles described herein may be made by one skilled in the art without departing from the true scope and spirit of the invention which is indicated by the following claims.

What is claimed is:

1. A magnetic recording medium, comprising
   a nonmagnetic substrate having a first and a second major surface,
   a magnetic layer provided on the first major surface of the substrate, comprising a magnetic pigment dispersed in a first polymeric binder, the magnetic pigment present in an amount of about 75 to about 88 percent by weight of the magnetic layer,
   a backside coating provided on the second major surface of the substrate, comprising two nonmagnetic pigments dispersed in a second polymeric binder, the first nonmagnetic pigment having a particle size of between 0.015 and 0.15 μm, and the second nonmagnetic pigment having a particle size of between 0.15 and 1.5 μm,
   wherein the magnetic layer has a lubricant absorption value of at least 4 and a surface roughness Rq of less than 15 nm, and the backside coating has a surface roughness Rq of between 15 and 150 nm, wherein the magnetic recording medium is a tape having a relative backside slippage between 71 and 83 percent and a magnetic/backside slippage ratio of at least 0.9.

2. The magnetic recording medium of claim 1, wherein said first nonmagnetic pigment is an antistatic particle.

3. The magnetic recording medium of claim 1, wherein said first nonmagnetic pigment is carbon black.

4. The magnetic recording medium of claim 1, wherein said first nonmagnetic pigment has a particle size of between 0.03 and 0.1 μm.

5. The magnetic recording medium of claim 1, wherein said second nonmagnetic pigment is selected from the group consisting of carbon black, $TiO_2$, $Al_2O_3$, and $SiO_2$.

6. The magnetic recording medium of claim 1, wherein said second nonmagnetic pigment has a particle size of between 0.3 and 0.7 μm.

7. The magnetic recording medium of claim 1, further comprising in the backside coating a third nonmagnetic pigment having a particle size of between 0.7 and 1.5 μm.

8. The magnetic recording medium of claim 1, further comprising in the backside coating a third nonmagnetic pigment selected from the group consisting of alumina, silica, carbon black, hollow ceramic microspheres, and $TiO_2$, wherein said third nonmagnetic pigment is of a different size than either of the first and second nonmagnetic pigments.

9. The magnetic recording medium of claim 1, wherein the backside coating has a surface roughness Rq of between 25 and 125 nm.

10. The magnetic recording medium of claim 1, wherein the magnetic layer comprises between 79 and 86 percent by weight of magnetic pigment.

11. The magnetic recording medium of claim 1, wherein the lubricant absorption value of the magnetic layer is between 5 and 15.

12. The magnetic recording medium of claim 1, wherein the magnetic layer has a surface roughness Rq of less than 10 nm.

13. The magnetic recording medium of claim 1, wherein the lubricant absorption value of the magnetic layer is between 5 and 9.

14. The magnetic recording medium of claim 1, wherein the magnetic layer further comprises at least one nonmagnetic pigment and the total amount of pigment in the magnetic layer is at least 80 percent by weight of the magnetic layer.

15. The magnetic recording medium of claim 1, wherein the first and second polymeric binders comprise a relatively softer component resin and a relatively harder component resin, wherein the relatively harder component resin is harder relative to the relatively softer component resin, wherein at least one of the relatively harder component resin and the relatively softer component resin comprises a pendant crosslinkable group and a pendant dispersing group, wherein the weight ratio of the relatively harder component resin to the relatively softer component resin is in the range from 1:19 to 19:1.

16. The magnetic recording medium of claim 15, wherein the soft component resin is a polyurethane comprising a plurality of pendant carboxy groups and the hard component resin is a non-halogenated vinyl copolymer comprising a plurality of pendant nitrile groups, a plurality of pendant hydroxy groups and a plurality of pendant dispersing groups.

17. The magnetic recording medium of claim 15, wherein the hard resin component is a nonhalogenated vinyl copolymer of monomers comprising 5 to 40 parts by weight (meth)acrylonitrile; 30 to 80 parts by weight of nonhalogenated, vinyl monomer; 5 to 30 parts by weight of nonhalogenated, hydroxy functional, vinyl monomer; and 0.25 to 10 parts by weight of a nonhalogenated, vinyl monomer bearing a dispersing group.

18. The magnetic recording medium of claim 16, wherein the carboxy-functional polyurethane has a carboxy equivalent weight of between 10,000 and 30,000.

19. The magnetic recording medium of claim 16, wherein the carboxy-functional polyurethane has a number average molecular weight in the range from 10,000 to 30,000, and a weight average molecular weight in the range from 25,000 to 75,000.

20. The magnetic recording medium of claim 15, wherein the dispersing group is selected from the group consisting of quaternary ammonium moieties, amines, sulfobetaines, —COOM where M is H or metal, —OPO(OM)$_2$ where M is H or metal, —SO$_3$M where M is H or metal, —OSO$_3$M where M is H or metal, —PO(OM)$_2$ where M is H or metal, and mixtures thereof.

21. The magnetic recording medium of claim 16, wherein the polyurethane is a copolymer of monomers comprising:
a) 30 to 60 parts by weight of a polydiol;
b) 5 to 20 parts by weight of a chain extender;
c) 40 to 50 parts by weight of a diisocyanate; and
d) 0.5 to 5 parts by weight a carboxy-functional diol.

22. The magnetic recording medium of claim 21, wherein the polydiol is polycaprolactone, the chain extender is neopentyl glycol, the diisocyanate is 4,4'-diphenylmethane diisocyanate, and the carboxy-functional diol is dimethyl propionic acid.

23. The magnetic recording medium of claim 21, further comprising a triol selected from the group consisting of glycerol, trimethylol propane, and polycaprolactone triols.

24. The magnetic recording to claim 1, wherein the relative backside slippage is between 77 and 83 percent, and the magnetic/backside slippage ration is at least 1.0.

25. A magnetic recording medium, comprising
a nonmagnetic substrate having a first and a second major surface,
a magnetic layer provided on the first major surface of the substrate, comprising a first polymeric binder, a magnetic pigment, and one or more nonmagnetic pigments, wherein the total amount of pigment is at least 80 percent by weight of the magnetic layer,
a backside coating provided on the second major surface of the substrate, comprising two nonmagnetic pigments dispersed in a second polymeric binder, the first nonmagnetic pigment having a particle size of between 0.015 and 0.15 µm, and the second nonmagnetic pigment having a particle size of between 0.15 and 1.5 µm,
wherein the magnetic layer has a lubricant absorption value of at least 4 and a surface roughness Rq of less than 15 nm, and the backside coating has a surface roughness Rq of between 15 and 150 nm, wherein the magnetic recording medium is a tape having a relative backside slippage between 71 and 83 percent and a magnetic/backside slippage ratio of at least 0.9.

26. A magnetic recording medium comprising a nonmagnetic substrate having a first and a second surface and a magnetic layer coated on said first surface, and a backside coating coated on said second surface wherein said magnetic layer comprises a magnetic pigment in a polymeric binder, said polymeric binder comprises a hard component resin and a soft component resin, wherein said soft component resin is a polyurethane comprising a plurality of pendant carboxy groups and said hard component resin is a nonhalogenated vinyl copolymer comprising a plurality of pendant nitrile groups, a plurality of pendant hydroxy groups, and a plurality of pendant dispersing groups, wherein the weight ratio of the hard component resin to the soft component resin is in the range from 1:19 to 19:1, wherein the magnetic recording medium is a tape having a relative backside slippage between 71 and 83 percent and a magnetic/backside slippage ratio of at least 0.9.

27. The magnetic recording medium of claim 26 wherein said nonhalogenated vinyl copolymer is a copolymer of monomers comprising 5 to 40 parts by weight (meth) acrylonitrile; 30 to 80 parts by weight of a nonhalogenated, vinyl monomer; 5 to 30 parts by weight of a nonhalogenated, hydroxy functional, vinyl monomer; and 0.25 to 10 parts by weight of a nonhalogenated, vinyl monomer bearing a dispersing group.

28. The magnetic recording medium of claim 26 wherein the polyurethane is a copolymer of monomers comprising:
a) 30 to 60 parts by weight of a polydiol;
b) 5 to 20 parts by weight of a chain extender;
c) 40 to 50 parts by weight of a diisocyanate; and
d) 0.5 to 5 parts by weight a carboxy-functional diol.

29. A magnetic recording medium comprising a nonmagnetic substrate having a first and a second major surface, a magnetic layer provided on the first major surface comprising a magnetic pigment dispersed in a first polymeric binder, and a backside coating on the second major surface comprising two nonmagnetic pigments in a second polymeric binder, wherein the relative backside slippage is between 71 and 83 percent and the magnetic/backside friction ratio is at least 0.9.

* * * * *